United States Patent Office 3,050,365
Patented Aug. 21, 1962

3,050,365
PREVENTION OF FORMATION OF INCRUSTATIONS DURING OXIDATION OF FERRIC CHLORIDE
Earl William Nelson, Lynchburg, and Thomas James Crossley, Amherst, Va., assignors to American Cyanamid Company, New York, N.Y., a corporation of Maine
No Drawing. Filed Aug. 13, 1959, Ser. No. 833,378
5 Claims. (Cl. 23—200)

The present invention relates to the combustion of iron chlorides. More particularly, the invention relates to a method of preventing formation of incrustations on the interior surface of apparatus wherein an iron chloride is subjected to combustion with oxygen to produce iron oxide and elementary chlorine.

It is known that gaseous iron chlorides and oxygen gas may be continuously subjected to combustion to yield iron oxide and chlorine according to the theoretical equations (I) $\qquad 2FeCl_3 + 1\frac{1}{2} O_2 \rightleftharpoons Fe_2O_3 + 3Cl_2$ and (II) $\qquad 2FeCl_2 + 1\frac{1}{2} O_2 \rightleftharpoons Fe_2O_3 + 2Cl_2$ During the combustion, incrustations (iron oxide, perhaps associated with ferrous chloride) form on the interior walls of the apparatus with the result that the reactor ultimately plugs. In the past, it has been proposed to remove these incrustations by the scouring action of abrasive particles, and to prevent formation of the incrustations by maintaining the areas to be protected below reaction temperature; see U.S. Patents Nos. 2,642,339 and 2,653,078, respectively, granted to R. H. Sawyer and F. W. Lane on June 16, 1953, and September 22, 1953.

The removal of the incrustations by scouring does not overcome the problem but only its effect, and the use of cooling is limited to the protection of small areas such as burner tips as the combustion reaction itself does not produce much heat.

The discovery has now been made that formation of incrustations on an interior surface of the reactor employed for the reaction described above can be inhibited and if desired prevented by maintaining this surface at a temperature in excess of the temperature of the reaction mixture in contact therewith. We have found that when the temperature of the inner surface of the reactor and discharge pipe and any other surfaces in contact with the gaseous mixture is maintained sufficiently high, formation of incrustations can be completely prevented within the apparatus.

A small increase in the temperature of the inner surface of the apparatus over the temperature of the combustion gas in contact therewith is sufficient to inhibit information of the aforementioned incrustations significantly. In the laboratory we have obtained a distinct inhibition of incrustation formation when the temperature of the walls of the apparatus are maintained as little as 10° C. above the temperature of the ambient reaction gases. On the other hand, we have found in a preferred instance that formation of incrustations is substantially completely prevented when the walls are maintained at a temperature 25° C. above the temperature of the ambient gases, so that evidently intense heating is not generally necessary. However, our invention includes the use of such higher temperatures as may be necessary for the purpose under the particular conditions prevailing in any instances.

Acording to the invention, the reactor has an inside diameter in excess of 5". When the diameter of the reactor is less, the ratio of the wall area to the volume of gas in the reactor is such that the temperature of the gas is always about the same as the temperature of the walls, so that the beneficial effect of the present invention does not occur. When the diameter of the reactor is in excess of about 5", it is readily feasible to maintain the walls of the reactor 10° C. or more in excess of the average temperature of the enclosed gas.

The reason why the step of maintaining the reaction tube at a temperature above the temperature of its contents should inhibit formation deposits is not known and we do not wish to be restricted by any theory. The evidence suggests, however, that the increased temperature favors the reaction of any deposited iron oxide with chlorine and suppresses the reaction of iron chloride with oxygen, so that deposited iron oxide is converted to iron chloride and formation of iron oxide on the surfaces is inhibited. When the difference in temperatures is substantial, evidently the iron oxide is converted to iron chloride about as fast as it is deposited, as plugging does not occur.

The invention is applicable to heretofore known processes for producing iron oxide and chlorine by combustion of ferric chloride or ferrous chloride with oxygen. In said processes ferric chloride, ferrous chloride or a mixture thereof is introduced with air or oxygen in about stoichiometrical equivalence into a combustion chamber operating in the range of about 600°–1000° C. An equilibrium reaction takes place and the off-gas consists essentially of iron oxide dust and chlorine along with unreacted iron chloride and oxygen. The reaction is only slightly exothermic and it is therefore customary to preheat one or both reagents to maintain operating temperatures.

The reaction yields a gaseous product and is therefore performed in a continuous reactor which may be a conventional straight-line gas burner having an inlet orifice and a discharge orifice, the fluidized bed reactor shown in U.S. Patent No. 2,642,339, the more complex chambered combustion apparatus shown Westcott U.S. Patent No. 1,992,685, granted on February 26, 1935, or the single chamber shown in Rowe et al. U.S. Patent No. 2,657,976, granted on November 3, 1953.

The reaction disclosed above may be readily modified to practice the present invention by installing means for maintaining the walls 10°–25° C. and preferably 50° C. (to provide an ample margin of safety) hotter than the temperature of the gases within. The invention does not depend upon the particular heating means employed, which may be conduits containing hot combustion gases or electric heaters.

In the specification and claims the term "reactor" includes the discharge conduit from the reaction zone, wherein the product gas is at a temperature above 500° C.

The invention will be more particularly illustrated by the example which follows. It will be understood that this example represents only one embodiment of the inventino and that the appended claims are not to be construed as limited thereto.

*Example 1*

The following illustrates application of the present invention to the combustion of iron chloride with oxygen in a reactor where the walls are maintained 25° C. above the temperature of the combustion mixture.

The apparatus is composed of a vertical reactor tube of firebrick 6" in diameter and 78" long closed at its upper end, and a discharge pipe 6" in diameter which runs from the top of the reactor tube diagonally downwards at an angle of 45°, terminating in an analysis system for the products. The bottom is closed with a plug which contained one orifice for the introduction of $FeCl_3$ and another for the introduction of oxygen.

The reactor and the discharge pipe each contain a thermocouple located half way up their length so as to measure the mean temperature of the contents. A thermocouple is embedded in the firebrick of each tube at the same level to measure the temperature of the tube walls. The reactor tube and the discharge tube are separately heated by electrical heating elements fastened along the outside of these tubes. The entire assembly is encased in two feet of thermally insulating brick.

The reactor and the take-off tube are preheated by the electrical heaters to 735° C. (as measured by the thermocouples in the walls). There is then admitted into the reactor a liquid stream of iron chloride at 325° C. (FeCl$_3$ containing 5% by weight FeCl$_2$ as impurity) and oxygen at room temperature. The iron chloride is supplied at a rate of 167 lb./hr. and oxygen at 14½ lb./hr.

A smooth partial combustion takes place. The combustion temperature is 700° C., as measured by the thermocouple in the reactor tube, and the temperature of the reaction products in the discharge tube is the same.

As the combustion takes place the temperature of the reaction tube drops and it is found necessary to supply five additional kw. of electric heat to maintain the tube temperature at 725° C. The combustion is continued for 24 hours. The product gas from the reactor analyses 38% ferric chloride, 57% chlorine and 5% oxygen by volume. At the end of the run the interior walls of the reactor and discharge tubes are inspected and are found to be free from incrustations. From prior experience it is known that if the step of maintaining the walls hotter than the reacting mixture is not followed, the reactor tube plugs after 3 to 6 hours of operation.

We claim:

1. In the production of an iron oxide and chlorine by continuous combustion of an iron chloride with oxygen in a reactor having an inside diameter in excess of five inches, the method of inhibiting formation of incrustations on an interior surface of said reactor which comprises maintaining said surface at a temperature at least 10° C. higher than the temperature of the reaction mixture in contact therewith.

2. A process according to claim 1 wherein the temperature at which said surface is maintained is sufficiently high to prevent formation of incrustations.

3. In the production of an iron oxide and chlorine by continuous combustion of an iron chloride with oxygen in a reactor consisting essentially of a vertical reactor tube and a discharge pipe having an inside diameter in excess of five inches, the method of inhibiting formation of incrustations on the interior surface of said discharge pipe which comprises maintaining the surface of said pipe at a temperature of at least 10° C. higher than the temperature of the gaseous mixture in contact therewith.

4. A process according to claim 3 wherein the temperature at which said surface is maintained is sufficiently high to prevent formation of incrustations.

5. Process according to claim 1 wherein the surface is maintained 25° C. to 50° C. higher than the temperature of the reaction mixture in contact therewith.

References Cited in the file of this patent

UNITED STATES PATENTS

| | | |
|---|---|---|
| 1,816,388 | Mittasch et al. | July 28, 1931 |
| 2,635,946 | Weber et al. | Apr. 21, 1953 |
| 2,642,339 | Sawyer | June 16, 1953 |
| 2,653,078 | Lane | Sept. 22, 1953 |